United States Patent [19]

Balban

[11] 3,980,318
[45] Sept. 14, 1976

[54] FUSED MULTIPLE STAGE INFLATION SYSTEM

[75] Inventor: Morton S. Balban, Oak Park, Mich.

[73] Assignee: Eaton Corporation, Cleveland, Ohio

[22] Filed: Apr. 15, 1974

[21] Appl. No.: 460,768

[52] U.S. Cl. ............................ 280/735; 180/103 A; 340/248 Y
[51] Int. Cl.² ........................................ B60R 21/08
[58] Field of Search .............. 280/150 AB; 180/103; 340/52 H, 248 Y; 222/3

[56] References Cited
UNITED STATES PATENTS

| | | | |
|---|---|---|---|
| 3,668,627 | 6/1972 | Brainerd | 180/103 X |
| 3,714,627 | 1/1973 | Dillman | 340/52 H |
| 3,737,887 | 6/1973 | Wakamatsu | 340/250 |
| 3,742,858 | 7/1973 | Stonestrom | 280/150 AB |
| 3,744,815 | 7/1973 | Scherenberg | 280/150 AB |
| 3,758,131 | 9/1973 | Stephenson | 180/105 R |
| 3,762,495 | 10/1973 | Usui | 180/103 |
| 3,767,002 | 10/1973 | Gillund | 280/150 AB |
| 3,773,352 | 11/1973 | Radke | 280/150 AB |
| 3,773,353 | 11/1973 | Trowbridge | 102/40 |
| 3,848,695 | 11/1974 | Lacaze | 280/150 AB X |
| 3,877,720 | 4/1975 | Upmeier | 280/150 AB |

Primary Examiner—M. H. Wood, Jr.
Assistant Examiner—John P. Silverstrim
Attorney, Agent, or Firm—Teagno & Toddy

[57] ABSTRACT

A vehicle safety system of the kind incorporating a crash activated safety device, such as an inflatable passive passenger restraint, and electro-explosive devices responsive to an electric current of preselected minimum amplitude and duration from an electrical supply for activating a corresponding safety device. Deceleration sensing means energize such an electro-explosive device from such power supply in the event of a crash. Redundant power supply means are preenergizable for enabling such energizing of the electro-explosive means in the event of disabling of the electrical power supply. A power supply protective fuse in series with a corresponding electro-explosive device protects the redundant power supply from inadvertent shorting and discharge by conductive members and fragments released in explosive energization of the electro-explosive device.

9 Claims, 2 Drawing Figures

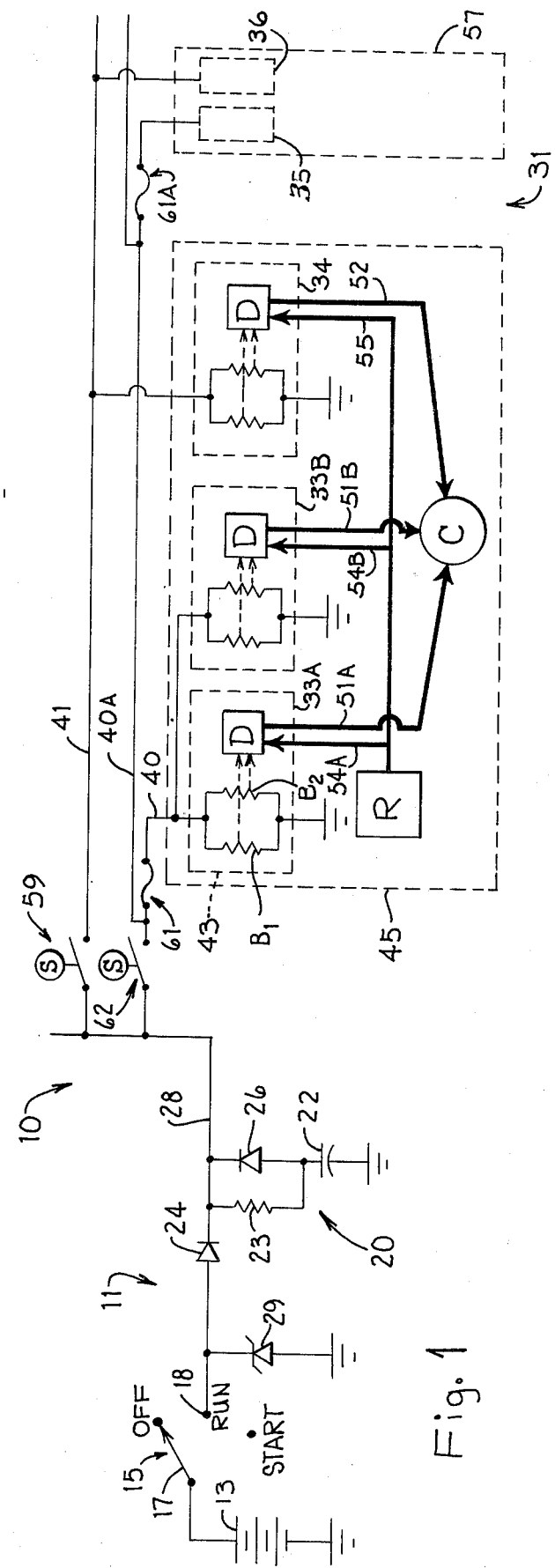

FUSED MULTIPLE STAGE INFLATION SYSTEM

The present application is related to U.S. Ser. No. 332,440 (now abandoned), filed Feb. 14, 1973, by the present applicant.

FIELD OF THE INVENTION

This invention relates to a vehicle safety system and more particularly relates to a fused multiple stage inflation system for passive passenger restraints.

BACKGROUND OF THE INVENTION

Vehicle safety systems of the type incorporating passive passenger restraints, as safety devices, have been known for some time. Such systems generally comprise at least one inflatable confinement, such as an inflatable bag or inflatable seat belt, which is inflated to restrain movement of a vehicle occupant during a collision. In systems of this type, the confinement is inflated when a crash sensor switch detects a vehicle deceleration of a predetermined magnitude indicative that a collision is occurring. Closure of the crash sensor switch completes an electrical circuit for flowing current to energize an actuator for the vehicle safety device. The actuator is frequently an electro-explosive device, incorporating a detonator coil, which upon energization causes the confinement to be inflated to an expanded, passenger restraining condition. A system of the general type above discussed, and to which the present invention may be applied, is shown in U.S. Pat. No. 3,414,292 to S. Oldberg et al., assigned to the Assignee of the present invention.

In such known systems, the energized electro-explosive device may inflate the confinement directly with explosion product gases generated thereby, or may inflate the confinement indirectly, as by unblocking a flow of pressurized gas from a reservoir into the confinement.

So called nonpassive restraints, such as conventional noninflatable seat belts, shoulder straps and the like, are to be placed in operative restraining position by the vehicle occupant well before the time of a collision, preferably before the vehicle is put in motion. In contrast, passive restraints of the kind above discussed, are not normally placed in confining condition by the vehicle occupant but rather must be reliably and automatically inflated to their restraint condition during a collision.

The vehicle battery is conveniently the primary electrical power source for energizing the electro-explosive device which activates the passive restraint. However, rapid deceleration of the vehicle and/or structural damage thereto during a collision, particularly in early stages of the collision, may disconnect the vehicle battery from the safety system or otherwise render it incapable of supplying current to operate the passive restraint. In recognition of this possibility, the present Applicant in his aforementioned application Ser. No. 332,440 additionally provides a redundant power supply (a capacitor normally maintained charged by the vehicle battery) capable of energizing the passive restraint should the vehicle battery be disabled. Such a redundant power supply can be made relatively compact and light in weight and can be positioned protectively within the vehicle so as to remain operable despite disabling of the primary electrical power source.

Electro-explosive devices used in such passive restraint systems may be similar to the type disclosed in the aforementioned Pat. No. 3,414,292 of Oldberg et al. Applicant has recognized that known electro-explosive devices may short circuit their electrical connections after functioning. Such shorts would disable the electrical power supply inhibiting or preventing its further effectiveness. Thus, a redundant supply of limited current supply capability may thus be drained, inhibiting its further functioning.

Applicant has further recognized that while in certain instances it would be desirable to allow sequential operation of several electro-explosive devices independently from a common power source, as in response to sequential increases in deceleration rate, shorting of the power source by firing of a one electro-explosive device may thus preclude firing remaining electro-explosive devices, thus denying the desired protection to occupants at one or more passive restraint locations in the vehicle. Similarly, shorting of one electro-explosive device, where a plurality of same are fired simultaneously, would prevent proper firing of the other remaining electro-explosive devices of the plurality of same where a common current limited power supply is used.

This problem is complicated by the fact that, to be acceptable, passive restraint systems are expected to operate with an extremely high level of reliability, but yet must be manufacturable and installable within reasonable cost limits. The problem is further complicated by the fact that the safety system must react quickly, and during the course of a collision, to properly inflate the inflatable restraints, the time available from collision initiation to full restraint inflation normally being in the range of 40 to 60 milliseconds for a 30 mile per hour collision with a stationary barrier, thus requiring rapid actuation of an initial electro-explosive device and, where several electro-explosive devices are to act sequentially, rapid sequencing thereof.

Accordingly, the objects of this invention include provision of:

1. A vehicle safety system particularly capable of operating passive passenger restraints in a staged manner and in which a shorting of one or more stages does not inhibit functioning of other stages.

2. A system, as aforesaid, in which each stage includes at least one electro-explosive device and in which functioning of related stages is independent of and cannot be inhibited by shorting of an electro-explosive device in one stage.

3. A system, as aforesaid, which provides for automatic disconnection of a shorted electro-explosive device from its power source and prevents draining of such power source thereby, so as to enable functioning of other stages fed by such power source.

4. A system, as aforesaid, capable of disconnecting the shorted electro-explosive device from its power supply within a few milliseconds after shorting occurs.

5. A system, as aforesaid, which enables reliable firing of several electro-explosive devices in sequence, despite shorting or impermissible partial shorting in one or more thereof upon firing, by a power supply capable of delivering only a limited electrical charge (i.e., capable of delivering only a limited current for a limited period of time).

6. A system, as aforesaid, capable of providing increased reliability in operation of multiple stage inflatable passenger restraint arrangements and wherein such increased reliability is achieved at low cost and despite shorting in electro-explosive restraint actuation devices upon functioning.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a vehicle safety system of the kind incorporating a crash activated safety device, such as an inflatable passive passenger restraint, and electro-explosive devices responsive to an electric current of preselected minimum amplitude and duration from an elecrical supply for activating a corresponding safety device. Deceleration sensing means energize such an electro-explosive device from such power supply in the event of a crash. Redundant power supply means are preenergizable for enabling such energizing of the electro-explosive means in the event of disabling of the electrical power supply. A power supply protective fuse in series with a corresponding electro-explosive device protects the redundant power supply from inadvertent shorting and discharge by conductive members and fragments released in explosive energization of the electro-explosive device.

BRIEF DESCRIPTION OF THE DRAWINGS

FIG. 1 diagrammatically discloses a safety system embodying the invention and incorporating multiple stages.

FIG. 2 discloses a modified embodiment.

DETAILED DESCRIPTION

FIG. 1 discloses a preferred embodiment of the invention comprising a vehicle safety system diagrammatically indicated at 10. A power supply unit 11 conveniently includes the vehicle battery 13 and, preferably, a portion of the vehicle ignition switch as indicated at 15. The battery 13 is connected between the movable contact 17 of the ignition switch 15 and vehicle ground, or a corresponding conductor not shown. Conventionally, the movable ignition switch contact 17 is alternatively engageable with several fixed contacts here labeled OFF, RUN, and START, the RUN contact being indicated at 18.

The power supply unit 11 further includes a redundant power supply 20 which here comprises a capacitor 22 chargable through a resistor 23 and a series diode 24 from the RUN contact 18 of the ignition switch when the latter is connected through movable contact 17 to the battery 13. The free end of the capacitor 22 is grounded. With a nominal vehicle battery voltage of 12 volts, which may normally fluctuate from 8 to 15 volts in use, a typical value for the capacitor 22 may be 10K microfarads. While the battery 13 may be poled as desired, in the particular embodiment shown the side of the battery 13 connected to the ignition switch is positive so that the anode side of diode 24 is coupled to the ignition switch. A further diode 26 parallels with resistor 23, the cathodes of diodes 24 and 26 connecting to a power supply unit output line 28. A Zener diode 29, poled as shown, is connected between ground and the contact 18 of the ignition switch to suppress transients during operation.

The system 10 further includes a deceleration sensing and firing unit 31 incorporating a plurality of electro-explosive devices generally indicated at 33A, 33B and 34–36. These electro-explosive devices may, for example, be of the type disclosed in aforementioned Oldberg et al. Pat. No. 3,414,292. As here schematically shown, each such electro-explosive device includes a pair (for redundancy in the event that one is or becomes defective) of parallel connected bridge wires B1 and B2 connected between the vehicle ground and a corresponding firing conductor, e.g., conductors 40 and 41. The bridge wires B1 and B2 are suitably housed, as indicated by broken line 43, in operative contact with an explosive powder charge D, whereby electrical current flow through bridge wire B1 or B2, or a predetermined minimum magnitude and duration, will explosively ignite the powder charge C. More particularly, the bridge wires act as electric resistance heaters requiring a given current input for a given time to reach a critical temperature at which the explosive fires. With reduced current, heating time is increased somewhat.

The electro-explosive devices 33A, 33B and 34 are, in the embodiment of FIG. 1, arranged in a multiple stage inflation assembly 45. The assembly 45 further includes a stage actuable confinement, or set of confinements, generally indicated at C. The confinement, or set, C may, for example, comprise a bag inflatable in stages, an associated set of bag compartments or separate bags inflatable in staged sequence or other restraints or restraint combinations susceptible to staged inflation. Gas produced by explosion of the detonated powder charge of the devices 33A, 33B and 34 may be routed directly to confinement C, for producing the desired inflation effect, in any convenient manner here diagrammatically indicated by heavy line paths 51A, 51B and 52 from electro-explosive devices 33A, 33B, and 34 respectively to the confinement C.

Alternatively, the electro-explosive devices may be arranged, in any convenient manner, as normally closed, explosively openable valves having an input side connected to at least one reservoir R through heavy line paths 54A, 54B and 55, respectively. In the latter instance, the reservoir R stores gas under pressure which upon activation of a given electroexplosive device, for example device 33A, is supplied through corresponding path 54A and then through path 51A to the confinement C for causing inflation in the manner above-discussed.

Further multiple stage inflation assemblies may be provided, one thereof being indicated at 57 and including aforementioned electro-explosive devices 35 and 36. Such further assemblies may be similar to the inflation assembly 45.

Firing conductor 41 connects through a deceleration sensing device 59 to the power supply unit output line 28. Correspondingly, firing conductor 40 connects through a series power supply protective device 61 and further deceleration sensing device 62 to said power supply line 28. The deceleration sensing devices 59 and 62 may be of any convenient type, such as that disclosed in aforementioned Oldberg et al. Pat. No. 3,414,292. Each of the deceleration sensing devices 59 and 62 incorporates a normally open switch mounted on the vehicle and responsive to a predetermined deceleration thereof for closing. In the particular embodiment of FIG. 1, deceleration sensing device 62 closes in response to a vehicle deceleration exceeding a first, low deceleration level and deceleration sensing device 59 closes in response to a vehicle deceleration exceeding a second, higher, deceleration level. The closing thresholds of the deceleration sensing devices 62 and 59 may be at, for example 5 G and 10 G, respectively, where G represents the acceleration of gravity. However, these thresholds may be selected within a relatively wide range of values.

The power supply protective device 61 comprises a fuse of well controlled blow time. More particularly, the fuse 61 is selected to remain unblown (closed) during a sufficient current flow and for a sufficient time as to fire, upon closure of the serially connected deceleration sensing device 62, the one or several electro-explosive devices (here devices 33A and 33B) in series therewith. In the embodiment shown, the bridge wires B1 and B2 of an electro-explosive device may typically have a resistance of about 5 ohms and each of the electro-explosive devices 33A and 33B may require, to fire, a current of about one-half ampere for 1 to 2 milliseconds time, that is, a total of about 1 ampere for about 1 to 2 milliseconds time. Practical are electro-explosive devices ranges for resistance of about 2–5 ohms, for current of about one-half to 1 ampere, and for time of about 1–5 milliseconds though the invention is not so limited.

On the other hand, the power supply protective fuse 61 will blow, and hence open, when the aforementioned firing current amplitude is significantly exceeded, for example when here subjected to a 9 to 10 ampere current for about 4 to 5 milliseconds. In the event of momentary higher current levels, blow time may drop to about 3½ milliseconds or so. On the other hand, with current reduced (as by a mere reduction in resistance in the exploding device, rather than a full short), blow time of fuse 61 may be somewhat longer, without problem. The fuse opening time is selected to preclude opening thereof by possible, short duration but high amplitude switching transients, as upon closure of the deceleration sensor 62 or during firing of the electro-explosive devices 33A and 33B in series therewith. However, the fuse must be capable of opening quickly after firing of its series electro-explosive device (should a short occur in the latter) so as to prevent interference with subsequent firing of other electro-explosive devices of the system.

The redundant power supply 20 is normally sized to be capable of supplying firing current to all electro-explosive devices connected thereto for a time sufficient to fire same, in the event of disabling of the vehicle battery 13. However, the redundant power supply 20 is not normally provided with current supply capability substantially in excess of that requirement. Thus, a substantially lower then normal resistance to ground, or a complete (substantially zero resistance) short to ground, in one or more electro-explosive devices could relatively quickly drain current from the redundant power supply 20 to such level as to render it incapable of thereafter firing remaining electro-explosive devices of the system. However, the aforementioned blow characteristic of the fuse 61, in terms of required blow current and blow time, is such that the fuse 61 will blow and disconnect a fired and substantially shorted electro-explosive device, in series therewith, from the power supply line 28, thus enabling the redundant power supply 20, in the event of failure of connection to the vehicle battery 13, to fire subsequently selected electro-explosive devices.

Thus, the current amplitude and time required to blow fuse 61 is well below the supply capability of the redundant supply 20.

While suitable fuses 61 may be readily manufactured according to known principles and may be commercially available from a number of sources, a typical example is the model No. 275,002 manufactured by Littlefuse, Inc. of 800 E. Northwest Highway, Des Plaines, Ill. 60016.

OPERATION

Although the operation of the system described above will be understood from the foregoing description by skilled persons, a summary of such description is now given for convenience.

The vehicle engine is started in a conventional manner by placing the movable contact 17 of the ignition switch 15 in the start position. Upon starting of the engine, release of the movable contact 17 allows same to return, as under the influence of a conventional spring mechanism not shown, to the RUN contact 18 wherein the ignition switch applies positive battery potential across the Zener diode 29 to charge capacitor 22 of the redundant power supply 20 through diode 24 and resistor 23. The resistor 23 is preferably selected to charge capacitor 22 to substantially the voltage of vehicle battery 13 relatively quickly, for example in a few seconds time, so that the redundant power supply 20 is fully charged by the time the vehicle is likely to have been put into motion.

During energization of an electro-explosive device, the battery 13 tends to maintain the voltage across the capacitor 22. The voltage drop across the resistor 23 reverse biases the diode 26 to prevent capacitor 22 from discharging. The Zener diode 29 protects against high transient voltages in excess of about 24 volts.

In the event that battery voltage is lost, as in a collision, the potential at the cathodes of diodes 24 and 26 will be less than the potential across the capacitor 22, whereupon diode 26 will become forward biased to permit the capacitor 22 to discharge and provide firing current through diode 26, line 28 and a closed one of the deceleration sensing devices 62 or 59 to fire electro-explosive devices in series therewith.

Although the deceleration sensing devices 59 and 62 may be arranged to sense vehicle deceleration in any desired direction, the primary concern is normally with protection of vehicle occupants in the event of a head-on or substantially head-on collision with another vehicle or fixed structure and so the deceleration sensors 59 and 62 will be assumed for convenience in present discussion to sense collisions involving a substantial change in forward momentum of the vehicle.

Sensors 59 and 62 are initially open and remain so during normal operation of the vehicle, including constant speed forward motion and normal and emergency braking, wherein the vehicle deceleration will normally be less than 1 or 1½ G.

Upon collision, the vehicle is subjected to rapidly increasing deceleration. Upon rise of deceleration magnitude to a preselected first level, the low level deceleration sensor 62 closes the current flow is from the power supply unit 11 through line 28, sensor 62, fuse 61 and line 40 to the electro-explosive devices 33A and 33B. The latter devices fire and rapidly apply pressurized gas through lines 51A and 51B to the confinement C initiating inflation thereof to restrain an adjacent occupant of the vehicle against injurious contact with surrounding portions of the vehicle toward which he is being impelled during the vehicle deceleration.

The fuse 61 remains closed (conductive) as current flows through the bridge wires of the electro-explosive devices 33A and 33B for a time sufficient to fire same. In the event that firing of such electro-explosive devices opens the path from line 40 to ground through the bridge wires thereof rendering same nonconductive after firing, the fuse 61 remains closed.

However, when an electro-explosive device explodes, wire or powder fragments released by the explosion may cause a short, or substantial short, across the terminals of the electro-explosive device and hence across the power supply unit 11. Thereupon, the current through the series connected fuse 61 rapidly increases, causing it to open circuit and thereby removing the short from across the power source. Opening of the fuse occurs very quickly, normally in a few milliseconds, following the firing and shorting of the series connected electro-explosive device. Current can then be drawn from the power source by subsequently fired electro-explosive devices.

This effect is of particular importance where the vehicle battery 13 is disabled in the collision, as by physical damage thereto or disconnection from the power supply line 28. In such event, opening of the fuse 61 prevents the shorted, fired electro-explosive device from draining the redundant power supply 20 sufficiently to prevent same from thereafter firing additional electro-explosive devices.

Should the deceleration level continue to increase at least to the threshold of the deceleration sensing device 59, the latter closes, applying current from the power output line 28 through line 41 to the further electro-explosive device 34 causing same to detonate and flow gas through line 52 to confinement C for further protecting the corresponding vehicle occupant against the increased deceleration.

As above indicated, actuation of the deceleration sensing devices 62 and 59 may be utilized to actuate corresponding electro-explosive devices associated in additional multistage, or other, inflation assemblies such as that shown at 57. Where the low deceleration electro-explosive devices are activated to deploy inflation assemblies, such inflation assemblies have substantially identical firing times, same may be connected to the low level deceleration sensor 62 through a common fuse 61. However, it is preferred that the low level electro-explosive devices of the additional inflation assemblies be connected to the low deceleration sensing device 62 through corresponding individual fuses as at 61A, which may be similar to fuse 61.

Although the high deceleration electro-explosive devices of several inflation assemblies as, for example, for separate driver and passenger restraint, may be, as shown, directly parallel connected to the high deceleration sensing device 59, it is also contemplated that fuses of the kind discussed above with respect to 61 may be interposed in series with individual high level electro-explosive devices 34, 36 in the manner shown with respect to the low level deceleration devices and fuses 61 and 61A.

MODIFICATION

FIG. 2 discloses a modified embodiment differing from the FIG. 1 embodiment in its deceleration sensing and firing unit 31A. The sensing and firing unit 31A comprises a plurality of sensing and firing sub-units or stages (of which two are indicated at 67 and 68) connected in parallel to the power supply unit output line 28. The sub-units each include a corresponding deceleration sensing device 69 in series with a power supply protective fuse 71 and an inflation assembly 72, each inflation assembly 72 including at least one electro-explosive device 73. Each electro-explosive device 73 is energizable to inflate a corresponding confinement $C_s$ either directly by release of its explosive gases thereinto or by opening a connection from a pressurized gas reservoir $R_s$ to such confinement. Elements 69, 71, 73, $C_s$ and $R_s$ preferably are similar to corresponding elements above described with respect to FIG. 1.

The deceleration sensing and firing unit 31A may be arranged to protect a given vehicle occupant from decelerations resulting from collision impacts on the vehicle from several different directions, occurring either simultaneously or in sequence. As to the latter, a vehicle equipped in accord with FIG. 2 may, for example, front end collide with a first obstacle and thereafter sidewardly collide with a second obstacle. In such example, the forward collision closes the sensing device 69 of sub-unit 67, firing the electro-explosive device 73 thereof and inflating the corresponding confinement to protect a given occupant from being impelled forwardly within the vehicle into injurious contact with portions of the vehicle located in front of him. Should a short, or substantial short, develop in such electro-explosive device, the fuse 71 of sub-unit 67, blows protecting the redundant power supply 20A from a spurious and disabling discharge, as above discussed with respect to FIG. 1. Thus, upon occurrence of the subsequent secondary sideward collision, the deceleration sensing device 69 and electro-explosive device 73 of further sub-unit 68 correspondingly function to inflate the corresponding further confinement of sub-unit 68, the latter being positioned to prevent the occupant from moving sidewardly into contact with adjacent portions of the vehicle.

Thus, functioning of each stage is independent of, and cannot be inhibited by the shorting of an electro-explosive device or devices within other stages. Should shorting of an electro-explosive device occur, then the fuse in series therewith, which has a known and well controlled blow, or opening, time, normally a few milliseconds, will open. Opening of such fuse causes any draining of the power source occasioned by such shorting to cease, thereby insuring functioning of other stages of the system.

In the FIG. 2 embodiment, the capacitor in the redundant supply 20A might typically have a value of 3500 to 5000 microfarads.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A vehicle safety system comprising:
    a. an electrical power supply;
    b. a redundant power supply pre-energizable by said electrical power supply;
    c. a first safety device;
    d. deceleration sensing means in series with each of said power supplies;
    e. a first electrical loop for actuating said first safety device, said first loop comprising a first electroexplosive means in series with said deceleration sensing means for actuating said safey device in response to actuation of said sensing means and a first power supply protective device in series with said first electroexplosive means for protecting said redundant power supply;

f. a second safety device; and, g. a second electrical loop in parallel with said first loop for actuating said second device, said second loop comprising a second electroexplosive means in series with said sensing means for actuating said second device in response to actuation of said sensing means and a second power supply protective means in series with said second electroexplosive means for protecting said redundant power supply means for inadvertent shortings and discharge by conductive members and fragments released by explosive energization of said second electroexplosive means.

2. The system of claim 1, wherein said sensing means comprises a first sensor in series with said first loop and a second sensor in series with said second loop.

3. The system of claim 2, wherein said first power supply protective means is in series with said first sensor and said second power supply protective device is in series with said second sensor.

4. The device defined in claim 3, wherein said first electroexplosive means comprises a plurality of electroexplosive devices.

5. The system defined in claim 2, wherein said first electroexplosive means comprises a plurality of electroexplosive devices in series with said first power supply protective means and said second electroexplosive means comprises a plurality of electroexplosive devices each in series with said second power supply protective means.

6. The system defined in claim 1, wherein said first electroexplosive means comprises a plurality of electroexplosive devices each in series with said first power supply protective device.

7. The system of claim 1, wherein said first power supply protective means comprises fuse means.

8. The system of claim 1 in which each of said electro-explosive means are energizable in response to application thereto of a predetermined minimum current for a predetermined minimum time interval, said electrical power supply and redundant power supply means are both capable of at least supplying a greater current for a greater time, and said power supply protective means comprises fuse means responsive to a preselected current therethrough for a preselected time for opening, said preselected current flow and preselected time being respectively intermediate said minimum and greater current flows and times.

9. The system of claim 1 in which said minimum current for a given electro-explosive means is about 0.5 ampere and said minimum time is about 1 to 2 milliseconds.

* * * * *

UNITED STATES PATENT AND TRADEMARK OFFICE
CERTIFICATE OF CORRECTION

PATENT NO. : 3,980,318

DATED : September 14, 1976

INVENTOR(S) : Morton S. Balban

It is certified that error appears in the above–identified patent and that said Letters Patent are hereby corrected as shown below:

Col. 4, line 14: "C" should read "D".

Col. 6, line 60: "the" first occurrence should read ---and---.

Signed and Sealed this

Sixteenth Day of November 1976

[SEAL]

Attest:

RUTH C. MASON
Attesting Officer

C. MARSHALL DANN
Commissioner of Patents and Trademarks